United States Patent
Chenu

(10) Patent No.: US 10,482,560 B2
(45) Date of Patent: Nov. 19, 2019

(54) SECURING A REMOTE VIDEO ACQUISITION IN REAL TIME

(71) Applicant: SIEMENS MOBILITY SAS, Chatillon (FR)

(72) Inventor: Eric Chenu, Chaville (FR)

(73) Assignee: Siemens Mobility SAS, Chatillon (FR)

(*) Notice: Subject to any disclaimer, the term of this patent is extended or adjusted under 35 U.S.C. 154(b) by 0 days.

(21) Appl. No.: 15/571,900

(22) PCT Filed: Mar. 7, 2016

(86) PCT No.: PCT/EP2016/054741
§ 371 (c)(1),
(2) Date: Nov. 6, 2017

(87) PCT Pub. No.: WO2016/177489
PCT Pub. Date: Nov. 10, 2016

(65) Prior Publication Data
US 2018/0137596 A1    May 17, 2018

(30) Foreign Application Priority Data
May 5, 2015    (EP) .................................. 152901260

(51) Int. Cl.
*G06K 9/00*    (2006.01)
*G06T 1/00*    (2006.01)
(Continued)

(52) U.S. Cl.
CPC .......... *G06T 1/005* (2013.01); *B61L 15/0027* (2013.01); *B61L 23/04* (2013.01);
(Continued)

(58) Field of Classification Search
CPC .... B61L 15/0027; B61L 23/04; B61L 23/041; B61L 27/0038; B61L 27/0088;
(Continued)

(56) References Cited

U.S. PATENT DOCUMENTS 6,310,956 B1 * 10/2001 Morito .................. G06T 1/0021
375/E7.089
6,993,148 B1 * 1/2006 Miyashita ............. G06T 1/0028
382/100
(Continued)

FOREIGN PATENT DOCUMENTS

EP    2012269 A1 *  1/2009    ........... G06T 1/0028
EP    2012269 A1     1/2009
EP    2341710 A2     7/2011

OTHER PUBLICATIONS

Hsu C-T, et al: "DCT-Based Watermarking for Video"; IEEE Transactions on Consumer Electronics, IEEE Service Center New York US; Feb. 1, 1998.

*Primary Examiner* — Amara Abdi
(74) *Attorney, Agent, or Firm* — Laurence Greenberg; Werner Stemer; Ralph Locher

(57) ABSTRACT

A method and a system secure a remote video transmission. A marker digitally encoded in bits is generated for an image. The encoded marker contains an identifier of the camera and a time variable. The encoded marker is inserted into the image. The insertion is carried out by adding, for each bit of the encoded marker, a pattern to the image in the spatial domain. The conversion of the pattern into the spectral domain is a predefined sub matrix of which a frequency coefficient encodes the bit of the marker. The encoded marker is extracted from the secure image. The time variable is verified by comparing with the time reference and the identifier of the camera to check the temporal freshness of the secure image and the origin of same. A failure is flagged if one of the items of information included in the encoded marker violates a security criterion.

15 Claims, 3 Drawing Sheets

(51) Int. Cl.

| | | |
|---|---|---|
| *B61L 23/04* | (2006.01) | |
| *H04N 7/18* | (2006.01) | |
| *B61L 15/00* | (2006.01) | |
| *B61L 27/00* | (2006.01) | |
| *H04N 19/467* | (2014.01) | |

(52) U.S. Cl.
CPC ......... *B61L 23/041* (2013.01); *B61L 27/0038* (2013.01); *B61L 27/0088* (2013.01); *B61L 27/0094* (2013.01); *G06K 9/00791* (2013.01); *H04N 7/183* (2013.01); *H04N 7/185* (2013.01); *H04N 19/467* (2014.11); *B61L 2027/005* (2013.01); *G06K 2009/00583* (2013.01); *G06T 2201/0052* (2013.01); *G06T 2201/0081* (2013.01); *G06T 2207/30204* (2013.01)

(58) Field of Classification Search
CPC .......... B61L 27/0094; B61L 2027/005; G06T 2201/0052; G06T 2201/0081; G06T 1/005; G06T 2207/30204; H04N 7/183; H04N 7/185; H04N 19/467; G06K 9/00791; G06K 2009/00583
See application file for complete search history.

(56) References Cited

U.S. PATENT DOCUMENTS

| | | | |
|---|---|---|---|
| 7,342,489 | B1 | 3/2008 | Milinusic et al. |
| 9,984,354 | B1* | 5/2018 | Chinoy ................ G06Q 10/087 |
| 2003/0123660 | A1* | 7/2003 | Fletcher ................ G06T 1/0028 |
| | | | 380/205 |
| 2005/0059339 | A1* | 3/2005 | Honda ..................... G06K 1/12 |
| | | | 455/3.01 |
| 2006/0020936 | A1* | 1/2006 | Wyatt .................... G06F 9/4411 |
| | | | 717/162 |
| 2009/0310865 | A1* | 12/2009 | Tarng ............... G08B 13/19671 |
| | | | 382/190 |
| 2011/0194726 | A1 | 8/2011 | Das Gupta et al. |
| 2013/0222591 | A1* | 8/2013 | Alves ..................... B61L 23/00 |
| | | | 348/148 |

\* cited by examiner

SECURING A REMOTE VIDEO ACQUISITION IN REAL TIME

BACKGROUND OF THE INVENTION

Field of the Invention

The present invention relates to a method and a system for securing a video system for the real-time remote display of images taken by a camera of said video system. In particular, the present invention relates to the securing of a video stream sent over a communication network in order to guarantee the authenticity of the images observed in terms of operational security, i.e. in order to guarantee at least the origin, integrity and temporal freshness of said video viewed remotely by an operator on a viewing monitor.

SUMMARY OF THE INVENTION

In particular, the present invention relates to the domain of guided vehicles requiring remote control by means of at least one on-board camera including a photosensitive receiver, said remote control being necessarily characterized by a high level of operational security. "Guided vehicle" refers to public transport means such as buses, trolleybuses, streetcars, subways, trains or train units, etc., as well as load transporting means such as, for example, overhead travelling cranes, for which safety is a very important factor. In particular, the invention relates to the railway domain, in particular to transport means fitted with a control system based on remote communication, for example trains fitted with a radio train control system, commonly referred to as "communication-based train control" (CBTC).

The present invention in particular makes it possible to drive a guided vehicle remotely. Indeed, it is known to the person skilled in the art that a series of successive images of an object taken by a camera can be sent remotely so that same can be viewed in real time at a site physically removed from said object. Thus, a camera on board a vehicle is able to film an object, for example a scene inside or outside the vehicle, and to cooperate with a video-image communication device comprising a transmitter/receiver able to send a video signal of the object filmed from the vehicle to a transmitter/receiver on the ground that is able to receive said video signal, and to cooperate with a display device in order to display said filmed object on the basis of said video signal received. Images can therefore be taken by said on-board camera so that same can be viewed remotely by an operator using said display device. However, the present invention is not restricted to the domain of guided vehicles, but can also be applied to or used in industry, for example to supervise a critical industrial process or any other task requiring a high degree of reliability and relevance relating to the image observed by an operator.

A video system such as the one described above including a camera, a device for communicating an image acquired by the camera to a display device remote from the camera, may suffer malfunctions that are potentially dangerous, for example for the remote driving of a guided vehicle.

Indeed, the image of an object taken by a photosensitive receiver of the camera and the remote display thereof, i.e. said image of said object displayed remotely, may be different. Indeed, video-system malfunctions may result in the image displayed remotely not matching the image of the object as filmed and captured by the photosensitive receiver of a camera. Numerous sources of errors could for example modify the content and/or sequencing of the images captured and processed by a video system: errors may come from the camera, the transmission device, the receiver device, or the display device. Thus, said errors may occur at different levels, for example during processing of a video image, during transmission of a video signal corresponding to said image or during the display thereof, thereby altering the image displayed.

Moreover, different operations on the images of a video film may cause disturbances of varying degrees of significance in the display and therefore the viewing thereof. These operations may for example be required for image-processing reasons (such as compression, filtering, encoding, sampling, etc.). Furthermore, errors or defects observed on an image sent digitally may result from the compression parameters used by a video encoder required to digitize the image, or from the network used by the communication device to send the video signal.

One object of the present invention is to propose a method and a system that are simple, safe and reliable, for securing the remote transmission by a video system of an image of an object or of a scene that is to be captured by a camera of said video system, said securing method and system being adaptable to all types of video system, and able to guarantee the security of said video system, in particular being able to secure the real-time correspondence of the image of said object displayed remotely and the image of said object captured by the photosensitive receiver of a camera of the video system.

Another object of the present invention is in particular to warn an operator located remotely from said object of any of the aforementioned malfunctions and sources of errors.

Correspondence between the image of an object displayed remotely and the image of said object filmed by the photosensitive receiver of the camera refers in particular to the conformity of the image viewed (or displayed) remotely at a time $t_2=t+\Delta t$ and representing said object at time t, with the image of said object taken by the photosensitive receiver at time $t_1=t$ and representing said object at time t. In other words, the present invention must make it possible to determine whether the image of an object taken by the photosensitive receiver at time $t_1$ is identical, at the same magnification, to the image of the same object displayed remotely at time $t_2$. Thus, an image of an object to be displayed remotely shall be deemed to be identical to an image of said object intended to be captured by a photosensitive receiver if each of the two images represents the same object, i.e. the object at the same time t, and if the delay $\Delta t$ does not exceed a predefined value, for example 0.5 seconds.

The present invention proposes a method for securing, in particular in real time, a video system designed to send and display an image of a scene captured by a camera remotely, said video system comprising a device for capturing an image of said scene using said camera, a communication device for sending said image to a remote station, and a display device for displaying said image at said remote station, said method being characterized by the following steps:

generation, preferably in real time, using a first securing processor and for said image, of a marker encoded digitally in bits, said encoded marker including at least one item of information encoded in binary that is used to identify the camera (hereinafter referred to as the "identifier of the camera") that took said image and an item of information encoded in binary that is used to identify, on the basis of a time reference, the date on which the image was taken by the camera (hereinafter referred to as the "time variable"), said first securing processor being designed to synchronize said time reference with a second securing processor, insertion, preferably in real time, of said encoded marker into the image taken by the camera in order to create a secure image designed to be sent by the communication device of the video system to the display device, the insertion into said image being carried out by the addition, in the spatial domain and for each bit of said encoded marker, of a pattern to said image, said pattern being characterized in that the conversion thereof into the spectral domain is a matrix (hereinafter referred to as a "submatrix", since the size thereof is the size of one block of the matrix obtained by transforming said image into the spectral domain. Given the size thereof, same is a submatrix of the matrix of the image in the spectral domain) that is predefined and of which at least one frequency coefficient encodes said bit of the encoded marker, transmission, preferably in real time, via the communication device of the video system, of the secure image to the display device, said secure image being transformable and/or compressible to facilitate the transmission of same, reception, preferably in real time, by the display device of said secure image, and acquisition of this latter by an acquisition device cooperating with an extraction device, notably before same is displayed using the display device, extraction, preferably in real time, of said secure image, of said encoded marker and transmission of said encoded marker thus extracted to said second processor, notably before the secure image is displayed using the display device, verification by said second securing processor, preferably in real time and notably before the secure image is displayed using the display device, of the time variable by comparison with said time reference and of the identifier of the camera included in the encoded marker in order to check the temporal freshness of the secure image and the sequencing thereof in relation to other secure images received, flagging a failure of the video system if at least one of the items of information included in the encoded marker violates a predefined security criterion, in particular one of the following predefined security criteria:

a time difference $\Delta t$ between the time variable and the time reference is less than a predefined value. Indeed, the second securing processor is able to determine whether the time difference between the time variable and the time reference exceeds said predefined value, and to flag such exceedance, the identifier of the camera extracted from the secure image is identical to the identifier of the camera that took the image. Indeed, said second processor for example includes a database used to determine the identifier of the camera filming a scene or a specific object, and is able to compare the identifier of the camera in question using the database with the identifier extracted from the encoded marker. If there is a difference, i.e. if the security criterion is violated, the flagging of a failure is automatically triggered. Optionally, the identifier of the camera extracted from the encoded marker of a secure image of a scene or object can also be compared, by said second securing processor, with a camera identifier previously extracted from an encoded marker of another secure image for the same scene, and flagging of a failure is automatically triggered if there is a difference, the encoded marker is complete, i.e. extracted in full from the secure image. Indeed, said second securing processor is in particular able to determine whether any bits of said encoded marker are missing from the secure image, for example because a redundancy of said secure marker in said secure image is missing and/or because bits of said encoded marker are missing from the secure image, said second securing processor being able, in this case, to determine a failure of the integrity of the secure image and to automatically trigger a flagging of said failure.

The method according to the invention can therefore be used to secure the remote transmission of said image of said object or scene by said video system. The encoded marker can be inserted optically at the input of the camera using said patterns in the spatial domain, or directly into the data of the raw image obtained at the output of the photosensitive receiver of the camera, i.e. before transformation or modification of said data of the raw image obtained at the output of the photosensitive receiver.

The present invention also proposes a device for securing, notably in real time, the remote transmission of an image of an object or scene to be taken by a camera of an image capture device of a video system, for example by a photosensitive receiver of the camera, said video system being designed to send and remotely view said image of said object or scene, said securing device being in particular adapted to said video system, i.e. designed to cooperate with this latter, and characterized in that it includes:

a first securing processor designed to cooperate with the camera and preferably to be carried on board with this latter, for example on board a guided vehicle, said first processor being designed to cooperate with a second remote securing processor, said first and second securing processors preferably comprising redundant processors (i.e. that are configured to perform an identical securing function), for example using 2oo2 or 2oo3 redundancy, said first and second securing processors being in particular securing processors that are designed to guarantee the security of processing and data by encoding (for example, a DIGISAFE securing processor), said first processor being designed notably to exchange one or more encoded messages with said second processor via a communication device in order to synchronize a time reference (for example a date). In particular, said communication device used to exchange encoded messages between the first and second securing processors can be said communication device of the video system or, in another embodiment of the present invention, a stand-alone and separate communication device of said communication device of the video system. Preferably, said first securing processor is able to use the communication device of the video system to exchange said encoded messages. Said first securing processor is also configured to produce or generate, notably in real time, a marker encoded digitally in bits and including at least the identifier of the camera and a time variable defined in relation to said time reference, said encoded marker being in particular protected by a code guaranteeing a predefined level of security, in particular a first group of bits of the encoded marker corresponds to the identifier of the camera, a second group of bits of the encoded marker corresponds to the time variable, and optionally a third group of bits of the encoded marker corresponds to an encoded redundancy of the identifier of the camera and of the time variable. This encoded redundancy can preferably be calculated by arithmetic coding, or by polynomial division/multiplication, or by a combination of these techniques, a device for inserting, notably in real time, the encoded marker into the image taken by the camera, said insertion device being designed to insert said encoded marker into said encoded image in the spatial domain, said insertion device notably including a library of patterns in the spatial domain, each pattern in the spatial domain being the transformation or conversion of a submatrix in the spectral domain (i.e. frequency domain) into the spatial domain, said submatrix notably being predefined or pre-calculated by the first securing processor to encode one bit (or several bits) in one (or more) predefined coefficient(s) of said submatrix, said submatrix is for example a matrix in which all of the frequency coefficients are zero (i.e. a black image in the spectral domain, i.e. intensity 0) except for a number n of predefined frequency coefficients that have a value other than zero, said value being chosen by said first securing processor to encode each of the bits of the encoded marker in one of the n frequency coefficients. Said insertion device is thus able to insert a pattern into said image in the spatial domain and for each bit of said encoded marker, the conversion of said pattern into the spectral domain being said predefined/precalculated submatrix in which at least one frequency coefficient encodes one bit of said encoded marker. In particular, said insertion device is able to select a pattern for each bit of the encoded marker that encodes at least the bit in the submatrix corresponding to said pattern in the spectral domain. Preferably, said selection is made as a function of the value of the frequency coefficient encoding said bit in the submatrix corresponding to said pattern and/or the value of a frequency coefficient of the matrix obtained after conversion into the frequency domain (or spectral domain) of said image acquired by the camera. For example, said insertion device is able to add the pattern to a portion of the image, the conversion of said pattern into the spectral domain being a submatrix in which the frequency coefficient encoding a bit of said encoded marker is the mean frequency of said portion when the latter is transformed into the spectral domain. In particular, the same pattern can be selected for several bits, the submatrix corresponding to said pattern encoding several bits in this case. Said insertion device is thus able to insert each of said patterns selected into said image in the spatial domain, in order to encode said encoded marker in said image in order to create a secure image to be sent by a communication device of the video system. According to the present invention, the encoded marker can be inserted into the image digitally (directly into the data of the raw image obtained at the output of the photosensitive receiver of the camera) or optically (upstream of the camera: the pattern being in this case optically superposed on the image of the object or scene before same is acquired by the camera). The insertion device is finally configured to send said secure image to the communication device of the video system so that this latter can be sent to the display device to be viewed by an operator at a control station remote from the scene or object filmed. Preferably, the insertion device is connected to the image capture device in order to be able to superpose said pattern onto said image of the camera in order to form said secure image that is then processed by the image capture device of the video system as if same were an image coming directly from the camera and sent to the communication device thereof for remote display at said remote control station.

The present invention also proposes a device for controlling, preferably in real time, a secure image of a scene or object in order to check that the secure image acquired and displayed remotely at a time t+Δt and showing said scene or object corresponds to an image of said scene or object acquired by a camera of a video system at a time t. According to the present invention, said image can be taken by a photosensitive receiver of the camera of an image capture device of a video system designed to enable the transmission and remote display of said image of said object or scene and is secured by an encoded marker. Said control device according to the invention is in particular adapted to said video system and is characterized in that it includes:

an acquisition device designed to receive or acquire said secure image, preferably in real time, via a communication device of the video system, an extraction device able to extract said encoded marker from said secure image, for example by comparing the secure image with a reference image or unsecured image of said scene or object, said extraction preferably being carried out in real time. Said extraction device is also designed to send said encoded marker extracted from the secure image to a second securing processor, said marker being encoded digitally in bits and including at least one identifier of the camera and a time variable, said second securing processor designed to cooperate with the display device of said secure image, said second processor being designed to also cooperate with a first securing processor with which same is preferably redundant (i.e. designed to perform an identical securing function), for example using 2oo2 or 2oo3 redundancy, or made by encoding information, said second processor being designed to exchange one or more encoded messages with said first processor via a communication device, for example via the communication device of the video system, in order to synchronize a time reference (for example a date), said second securing processor being designed to verify, preferably in real time and notably before the secure image is displayed by said display device, the encoded marker extracted from the secure image, said second securing processor checking at least the identifier of the camera and the time variable in order to check the temporal freshness of the secure image and the sequencing thereof in relation to other secure images received. In particular, the time variable is checked by comparing said time variable with the time reference in order to determine a time difference Δt separating the acquisition of the image of the scene or object by the camera and the display thereof by the display device, the second securing processor being designed to automatically send a warning signal intended to warn an operator of a failure of the video system, said warning signal being for example sent to the display device.

The present invention also relates to a system for securing, in particular in real time, the remote transmission of an image of an object or scene to be captured by an image capture device of a video system, said securing system including said securing device and said detection device, said securing device and detection device being intended to cooperate with each other to enable the securing of the transmission of the image of said object or scene to a control station remote from said object or scene by means of said video system. The securing device and the detection device are thus able to cooperate with the video system, comprising for example:
- an image capture device including a camera, said image capture device potentially being carried on board a vehicle,
- a display device for remotely displaying said image acquired by the image capture device,
- a communication device including for example a transmitter/receiver connected to said image capture device and a transmitter/receiver connected to the display device to enable the transmission of said image between the image capture device and the display device, in order to secure the transmission of the image of said object or scene taken by the image capture device and to guarantee that the image of said object or scene taken for example by a photosensitive receiver of a camera of the image capture device matches the image of said object displayed remotely using the display device, said securing occurring notably in real time.

Thus, the present invention is in particular able to guarantee that an image of an object or scene taken by a camera of a video system matches the display thereof used to remotely display said object or scene by superposition, in the spatial domain, of said image and of each of said patterns in order to create a secure image including an encoded marker in order to check the freshness of the remotely viewed image and/or the integrity and/or the provenance of same. Preferably, said first securing processor is designed to produce a binary encoded redundancy of the identifier of the camera and of the time variable, this binary encoded redundancy being produced by arithmetic coding, or by polynomial division and/or multiplication (CRC) or by a combination of these two methods. Furthermore, said first processor is in particular designed to extend the length of said redundancy (i.e. to increase the number of bits of the encoded marker) in order to produce a code containing enough bits to fill a set of submatrices in the frequency domain that, once converted into the spatial domain, create patterns designed to cover a portion or preferably all of the image by superposition on this latter.

According to a first embodiment, each pattern is superposed optically on the optical image of the scene or object before acquisition by the photosensitive receiver of the camera. In this first embodiment, the insertion device is able to optically superpose two images at the input of the camera, i.e. the image of said object or scene as normally filmed by the camera and an image including the patterns designed to encode said encoded marker for said image of the scene or object. In this case, the photosensitive receiver sends a signal relating to the secure image directly. According to another embodiment, each pattern is added digitally to the data of the raw image obtained at the output of the photosensitive receiver of the camera in order to create, in the spatial domain, a secure image corresponding to the superposition of each pattern selected to encode the encoded marker and of the image of said object or scene acquired by the camera.

The control device according to the invention is able to analyze the information encoded by said encoded marker in the secure image in order to determine whether the image of said object or scene displayable remotely by the display device of the video system matches the image of said object or scene captured by the photosensitive receiver of the camera. Moreover, the control device, notably said second securing processor, is in particular able to flag, for example visually and/or audibly, a failure of the remote transmission of the secure image of said object or scene, for example by detecting a match difference in the image of said object or scene acquired by the camera and returned remotely by a video signal of the secure image sent by the communication device to the display device.

Finally, said second securing processor is in particular able to cooperate with said display device of the video system in order to enable for example the display on a single screen of said secure image of said object or scene, or of said image obtained following extraction of the encoded marker, and of the time variable and/or the identifier of the camera.

The present invention can be better understood through the exemplary embodiments and applications provided using the figures below.

DESCRIPTION OF THE INVENTION

Figure 1:
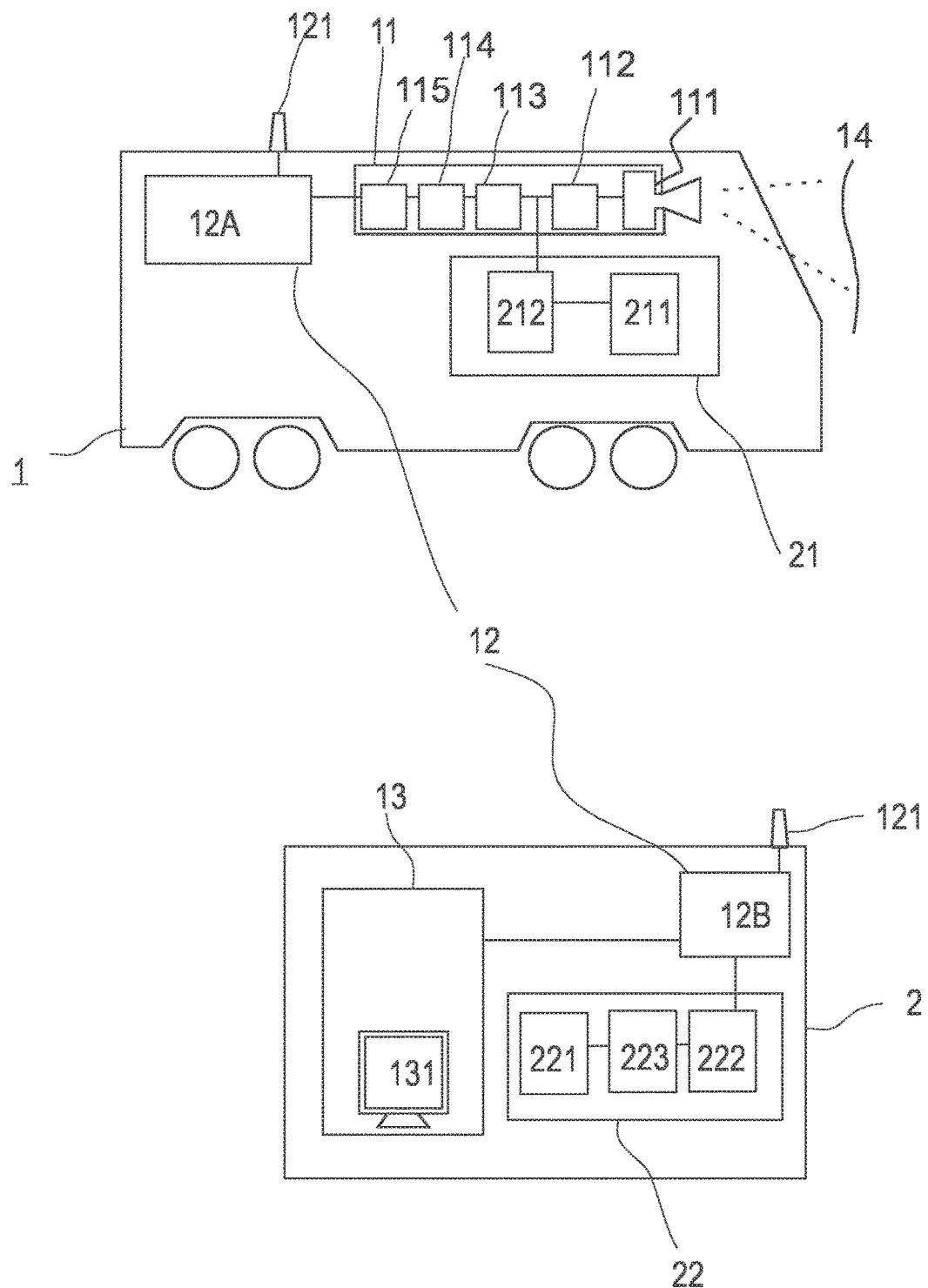
FIG. 1 Exemplary embodiment according to the invention of a system for securing a transmission of a video image.

By way of example, FIG. 1 shows a securing system designed to secure a remote transmission by a video system of an image of a scene 14, said image being in particular intended to act on a photosensitive receiver of a camera 111 of an acquisition system 11 of said video system, and to be used for example to remotely control a vehicle 1.

Said video system comprises in particular:
- the capture device 11 for capturing an image of a scene 14 for example using a camera 111, including said photosensitive receiver, which can be carried on board said vehicle 1 or remotely located in relation to a remote control station 2, said photosensitive receiver being able to convert light radiation into a video signal,
- a communication device 12 able to transmit said video signal from said photo receiver to a display device 13. Said communication device 12 comprising for example a transmitter/receiver 12A that is designed to be carried on board said vehicle 1, for example coupled to the capture device 11, in order to send said video signal, for example by means of an antenna 121 that can be fitted to said communication device and is designed to remotely transmit said video signal, and a transmitter/receiver 12B that is designed to be installed in the control station 2 to receive said video signal by means of an antenna 121,
- said display device 13, which can be coupled to said communication device 12, for example to the transmitter/receiver 12B thereof, and designed to process said video signal in order to display the images received, for example on a screen 131.

In other words, said video system is a system for remotely viewing at least one image taken by said capture device 11, said image being intended for example to enable an operator, located at the control station 2, to remotely control said vehicle 1 by viewing the real-time display of said image of said object at the control station 2. Said securing system according to the invention is in particular intended to be coupled and to cooperate with such a video system so as to guarantee a match between an image of said object taken by the photosensitive receiver 11 at a time $t_1$, and said image of said object displayable in real-time remotely using said display device 13 at a time $t+\Delta t$.

The securing system according to the invention includes a securing device 21 and a control device 22 that cooperate with one another in order to secure the transmission of said image of the scene 14 using the video system. The securing device 21 includes a first securing processor 211 that is designed to cooperate with the image capture device 11 of the video system in order to secure said images, and with a second securing processor 221 of the control device in order to synchronize a time reference and optionally to exchange a security key.

Said first processor 211 is designed to produce a marker encoded digitally in bits including at least one identifier of the camera, a time variable defined in relation to said time reference, and optionally a redundancy of the identifier of the camera and of the time variable produced by arithmetic coding, or by polynomial division/multiplication (CRC) or by a combination of these two techniques. The first processor cooperates with an insertion device 212 designed to insert said encoded marker into the image acquired by the camera 111 of the capture device 11 of the video system. The insertion device 212 is able to create a secure image designed to be sent by the communication device 12 to the display device 13. Said insertion device 212 is designed to insert a pattern into said image in the spatial domain and for each bit of said encoded marker, the conversion of said pattern into the spectral domain being a predefined submatrix in which at least one frequency coefficient encodes said bit of the encoded marker. In other words, the insertion device 212 is able to create a secure image that is the superposition of the image acquired by said camera and at least one pattern, each pattern encoding at least one bit of said encoded marker such that said encoded marker is completely encoded by the set of patterns designed to be superposed on said image.

Preferably, the insertion device 212 includes a library of precalculated patterns and a module designed to select, notably in real time, the pattern or patterns as a function of the bits of the encoded marker, and to add or superpose, notably in real time, said patterns to the image captured by the camera 111. The insertion device 212 includes for example a field-programmable gate array (FPGA) or a microcontroller connected at the output of the camera 111 to the stream of images acquired by said camera 111. Preferably, said FPGA or microcontroller is designed to communicate with said first securing controller 211 and with a memory of the insertion device 212 including said pattern library. The insertion device 212, and notably the FPGA thereof, is for example connected downstream (i.e. after) a pre-processing module 112 designed to perform the analog/digital (A/D) conversion of the images acquired by the camera, but upstream (i.e. before) the filter-processing devices 113, discrete cosine transform (DCT) or Fourier transform device 114 and compression device 115 for said images (for example MPEG) in relation to a transmission direction of the video signal intended to display said images at said control station 2. Following insertion of said pattern in said image by the insertion device, the image obtained is secured and may undergo different image processes performed by the image capture device 11 of the video system before being sent to the communication device 12 for transmission to the remote control station 2.

Preferably, the bits of the encoded marker are distributed throughout the image such that the encoded marker inserted in each image of the video stream coming from said camera 111 can only be extracted if all of the data making up the secure image is processed by said extraction device 22. This securely guarantees the integrity of the image sent. In particular, the video stream from the camera 111 is secured by inserting an encoded marker sufficiently frequently in the images making up said video stream, for example in every second image, or less frequently as required. Thus, it is not necessary to secure all of the images of the video stream, but to treat a sufficient number thereof to ensure that any corruption of the unmarked images causes a clearly visible deterioration of the video (for example such as to make same unusable). The time variable inserted in the images notably makes it possible to guarantee the correct sequencing of the images observed and the temporal freshness thereof. The identifier of the camera makes it possible to guarantee and verify the origin of the image.

Figure 2A:
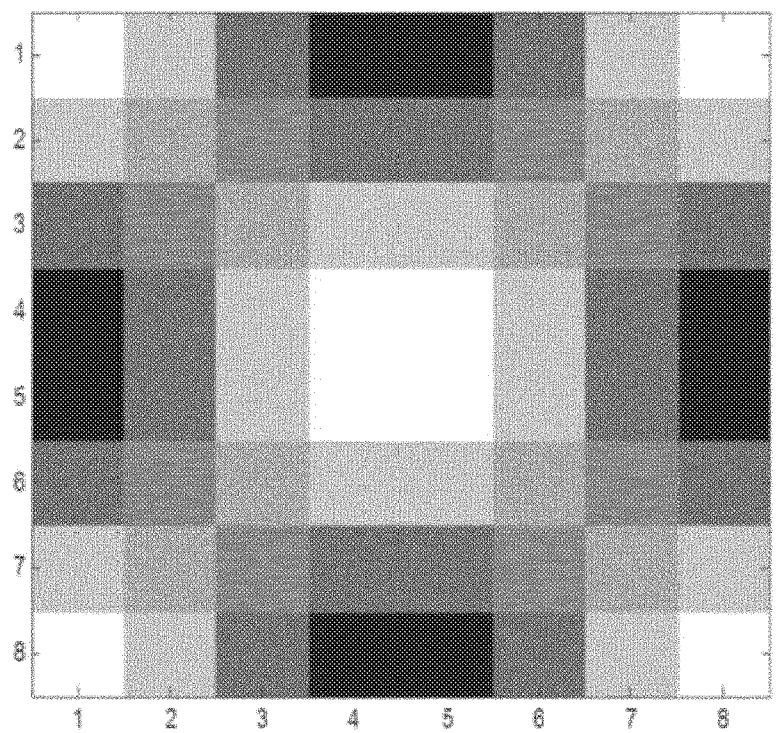
FIG. 2 Example pattern according to the invention.
Figure 2B:
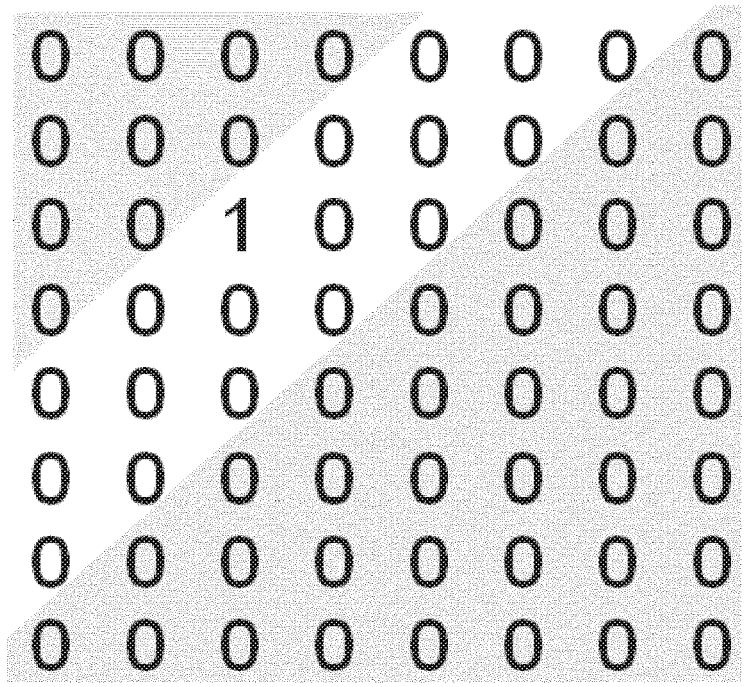
Figure 3:
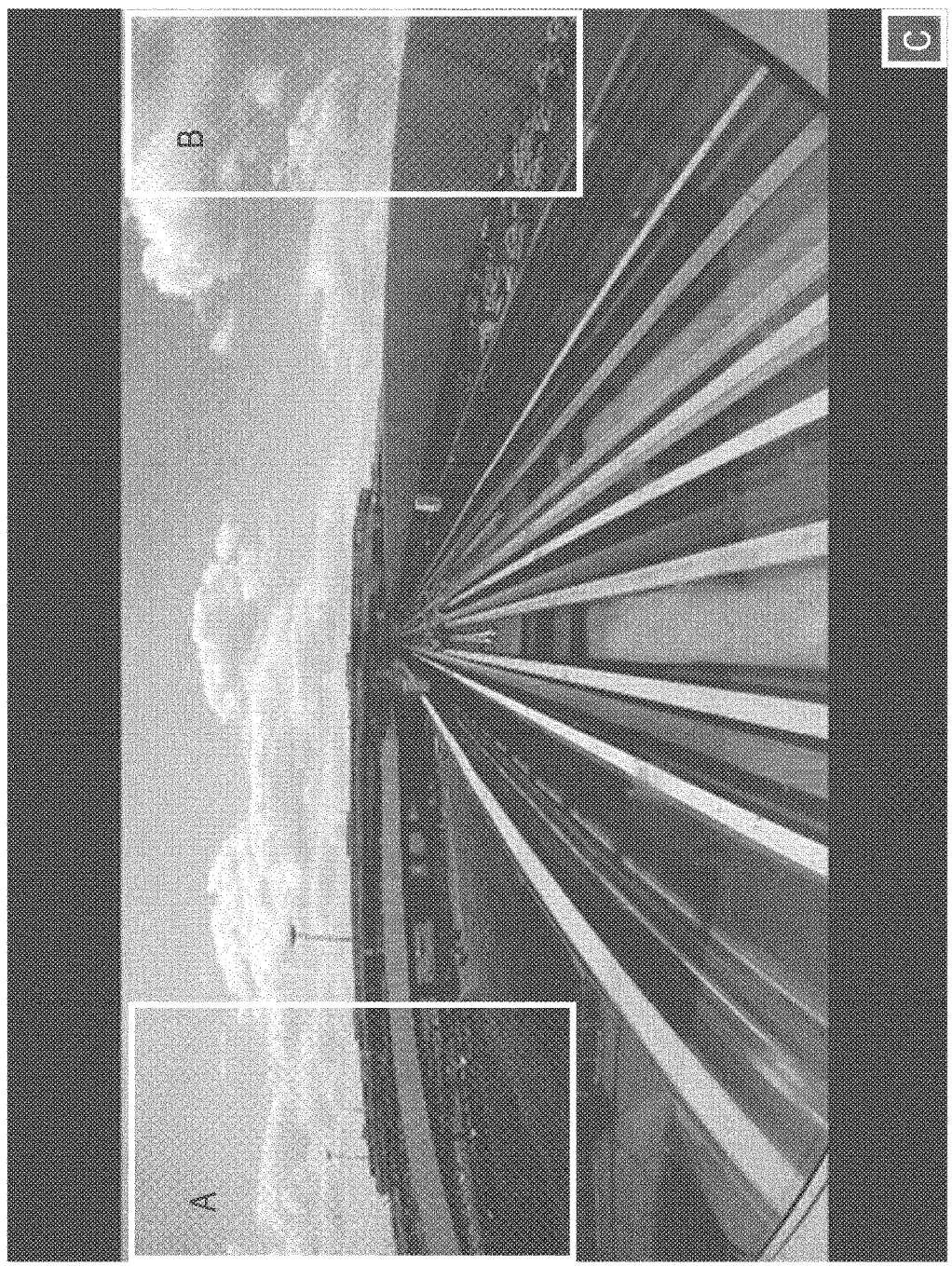
FIG. 3 Example secure image according to the invention.

In particular, FIGS. 2 and 3 show an example pattern according to the invention and an image according to the invention secured by insertion of said pattern.

According to the present invention, the pattern library includes a set of patterns defined in the spatial domain (see FIG. 2A) corresponding to a submatrix in the spectral domain (see FIG. 2B) in which at least one coefficient (for example the coefficient 3,3) of the matrix shown in FIG. 2B) has a value used to encode a bit of the encoded marker.

FIG. 2A thus shows a spatial representation of a pattern used to code the value +1 on the coefficient (3,3) of an 8×8 submatrix shown in FIG. 2B, showing the frequency coefficients ranging from low frequencies (coefficient (1,1)—top left) to high frequencies (coefficient (8,8)—bottom right). Preferably, each submatrix corresponding to a pattern of said library in the spatial domain is a submatrix showing a black image in the spectral domain and in which at least one frequency coefficient is modified to code at least one bit of said encoded marker.

In order to obtain said patterns, the submatrices corresponding to said patterns have notably been converted into the spatial plane by said insertion device 212, for example using an inverse discrete cosine transform (DCT) or a Fourier transform or a wavelet transform. Thus, a set of patterns is obtained and forms said library. Said patterns can be added to the image in the spatial plane (in pixels) by the insertion device 212 as a function of the encoded marker determined by the first securing processor 211. When the secure image, including the superposition of the image acquired by the camera 111 and said pattern, is transformed into the spectral plane, a coding of the encoded marker in the image in the spectral plane is obtained. One of the advantages of the present invention is the pre-calculation of the patterns in the library, thereby enabling image processing to be minimized.

According to the present invention, said encoded marker includes an identifier of the camera 111 and a time variable defined in relation to a time reference that is synchronized between said first processor 211 and a second processor 221, and optionally an encoded redundancy of the identifier and of the time variable. The bits of the encoded marker are distributed through one or more of said submatrices designed to be turned into patterns. In particular, said first processor 211 is able to break down the image acquired by the camera 111 into a number n of other submatrices to enable the insertion device 212 to superpose a pattern according to the invention onto each of these other submatrices, said pattern coding at least one bit of said marker. Thus, each submatrix of the image, i.e. each of these "other" submatrices, corresponds to a pattern, that is superposed by the insertion device 212, representing a submatrix encoding at least one bit of the encoded marker in the frequency domain. Preferably, said marker may include, in addition to the bits that show the identifier of the camera and the time variable, an encoded redundancy of said identifier and of the time variable, the bits of said encoded redundancy also being encoded in the patterns designed to be superposed on the submatrices making up the image (i.e. said other submatrices). In other words, the present invention proposes, and said first processor 211 is in particular capable of, "lengthening" the code of the encoded marker using bits representing a redundancy of the identifier and of the time variable, notably to obtain an encoded marker including as many bits as there are submatrices in said image following breakdown by said first processor 211 (for example n bits if there are n submatrices in said image) or in order to repeat the code of said encoded marker in the image in order to increase the robustness of the coding on extraction (i.e. on receipt). Indeed, in this manner, if one of the bits of the encoded marker is altered by a submatrix of the secure image, it becomes possible to extract same from another submatrix of the secure image (if the alteration is detected by verifying the encoded redundancy, for example), said submatrix of the secure image corresponding to the superposition of one of said patterns and of one of the submatrices of the image acquired by the camera.

FIG. 3 shows an image secured using the method according to the invention. In this particular example, the patterns have been inserted in the upper right and left portions of the image with an intensity that has been augmented deliberately to make same visible (see respectively the rectangles A and B in FIG. 3). Optionally, the insertion device 212 is able to insert a presence indicator C of the encoded marker in order to easily differentiate a secure image from an unsecured image.

The video stream received at the control station 2 is checked by extracting and checking the data included in the time marker using the control device 22. An acquisition device 222 is preferably connected to the communication device 12 of the video system in order to acquire the stream of secure images sent by the acquisition device 11 to the display device 13. It should be noted that, in this exemplary embodiment, the securing of the transmission does not cover the screen 131 of the display device. An alternative in which the entire transmission chain of the video stream is secured as far as said screen 131 is to acquire the secure images using said acquisition device 222 including a camera designed to film said screen 131, followed by extraction of the encoded marker on the video stream captured by said camera designed to film said screen 131. In this case, the entire transmission chain of the video stream is secured, including the screen 131.

Each secure image acquired by the acquisition device 222 is sent to an extraction device 223 that is designed to extract said encoded marker from said secure image. Said extraction device 223 is notably able to extract the encoded marker from the secure image in the spectral domain. For this purpose, it may for example use an inverse discrete cosine transform (DCT) or a Fourier transform or a wavelet transform. Preferably, the encoded marker is extracted by comparison of the secure image with a reference image, said reference image being free of any encoding with said encoded marker and representing for example a reference scene filmed by the camera 111 or an image previously received by the communication device and free of any encoding using said encoded marker. The data relating to the encoded marker extracted from the secure image by said extraction device 223 are then sent to the second processor 221 to check the freshness, origin and optionally the integrity of the image.

Said second securing processor 221 is notably capable of cooperating with the display device 13 of the video system in order to flag any failure of the transmission of the video stream. Said second processor 221 is designed to check the origin of the secure image using the identifier of the camera and the freshness of the secure image by comparison of the time variable with a time reference that is synchronized with said first processor 211. In particular, said second processor 221 is designed to automatically flag a failure of the video system if at least one of the items of information included in the encoded marker violates a predefined security criterion or, in other words, if the time variable and/or the identifier of the camera extracted from the encoded marker is different from a predefined security setting, for example if the time difference between the acquisition of the image by the acquisition device 11 and the display of said image using the display device 13 exceeds a predefined value and/or if the identifier of the camera is different from an identifier previously extracted for a secure image for said camera or is different from an identifier memorized in the second processor or in a database of said second processor. Optionally, the integrity of the image sent by the communication system may also be checked. In this case, the insertion device 212 is designed to superpose patterns onto said image acquired by the camera 111 in order to completely cover said image with said patterns. In this case, since the encoded marker is distributed throughout the image, it is only possible to extract said encoded marker if a complete secure image is acquired by the extraction device. In the opposite case, the encoded marker cannot be extracted from said secure image. Preferably, the extraction device 223 is designed to flag an extraction failure of an encoded marker, i.e. any inability to extract an encoded marker from a secure image, said flag being directly sent to the display device 13 or to the second processor 221 which sends said flag as a failure of the video system.

In summary, the method and the system for securing a transmission of a video image, as well as the securing device and the detection device according to the invention have several advantages over the existing securing methods and systems in that:

they obviate the need to design a securing system in which each subsystem is operationally secure. Indeed, the security of the entire video system, and not each of the sub-elements comprising said video system, is validated. This principle of reproducing the video image makes it possible to avoid causes of failure in the video system, providing an operator remotely viewing the video image of an object with information relating to the origin, freshness and optionally the integrity of the image, they make it possible to automatically diagnose a failure of the video system and to automatically trigger an alarm (visual, audible, vibrating, etc.) associated for example with the switching of a remote-control system of the vehicle into a safe state.

The invention claimed is:

1. A method for flagging a failure of a video system configured to send and display an image of a scene captured by a camera remotely, the video system having a device for capturing the image of the scene using the camera, a communication device for sending the image to a remote control station, and a display device for displaying the image at the remote control station, which comprises the steps of:

generating for the image, via a first securing processor, an encoded marker encoded digitally in bits, the encoded marker including at least one item of information, being an identifier of the camera, encoded in binary that is used to identify the camera that took the image and an item of information, being a time variable, encoded in binary that is used to identify a date on which the image was taken by the camera in relation to a time reference, the first securing processor being configured to synchronize the time reference with a second processor;

inserting the encoded marker into the image taken by the camera in order to create a secure image configured to be sent by the communication device of the video system to the display device, an insertion into the image being carried out by an addition, for each bit of the encoded marker, of a pattern to the image in a spatial domain, the pattern being characterized in that a conversion thereof into the spectral domain is a predefined sub matrix of which at least one frequency coefficient encodes the bit of the encoded marker;

transmitting the secure image to the display device;

acquiring the secure image by an acquisition device to enable extraction of the encoded marker by an extraction device;

extracting the encoded marker of the secure image;

transmitting the encoded marker to the second processor;

verifying, via the second processor, the time variable by comparison with the time reference and of the identifier of the camera in order to check a temporal freshness of the secure image and an origin thereof using the identifier of the camera; and flagging the failure of the video system if at least one of the items of information included in the encoded marker violates a predefined security criterion.

2. The method according to claim 1, which further comprises selecting the predefined security criterion from at least one of the following criteria:

a time difference between the time variable and the time reference that is less than a predefined value;

the identifier of the camera extracted from the secure image that is identical to the identifier of the camera that took the image; and an integrity of the encoded marker extracted from the secure image.

3. The method according to claim 1, which further comprises verifying an integrity of the secure image.

4. The method according to claim 1, which further comprises selecting, from a library of preprocessed patterns, the preprocessed patterns that can be used to encode the encoded marker.

5. A securing device for flagging a failure of a remote transmission of an image of a scene that is intended to be captured by an image capture device of a video system configured for a transmission and remote display of the image, the securing device comprising:

a first securing processor configured to cooperate with a camera of the image capture device, said first securing processor configured to produce a marker encoded digitally in bits, the encoded marker including at least one item of information, being an identifier of the camera, encoded in binary that is used to identify the camera and an item of information, being a time variable, encoded in binary that is used to identify a date on which the image was taken by the camera in relation to a time reference, said first securing processor configured to cooperate with a second securing processor to synchronize the time reference; and an insertion device for inserting the encoded marker into the image taken by the camera in order to create a secure image configured to be sent by a communication device of the video system, said insertion device configured to insert a pattern into the image, in a spatial domain and for each bit of the encoded marker, a conversion of the pattern into a spectral domain being a predefined sub matrix of which at least one frequency coefficient encodes a bit of the encoded marker, in order to create the secure image, said insertion device also being configured to send the secure image to the communication device.

6. The securing device according to claim 5, wherein said first securing processor is configured to exchange at least one encoded message with the second securing processor in order to synchronize the time reference.

7. The securing device according to claim 5, wherein the encoded marker is protected by a code guaranteeing a predefined level of security.

8. The securing device according to claim 5, wherein said insertion device includes a library of patterns in the spatial domain, each pattern being a conversion of a sub matrix in the spectral domain into the spatial domain, the sub matrix being predefined to encode one bit in a predefined frequency coefficient of the sub matrix.

9. The securing device according to claim 8, wherein the sub matrix is a matrix in which each frequency coefficient is a zero except for a number n of predefined frequency coefficients that have a value other than zero, the value being chosen by said first securing processor to encode a different bit of the encoded marker for each of the n frequency coefficients.

10. The securing device according to claim 8, wherein said insertion device is able to select the pattern from the library of patterns for each bit of the encoded marker as a function of the value of the frequency coefficient encoding the bit and/or a value of the frequency coefficient of the matrix representing the conversion of the image acquired by the camera into a frequency domain.

11. A control device for an image of a scene displayed remotely, the image being capturable by a camera of an image capture device of a video system configured for a transmission and remote display of the image, the image also being an image flaggable for a failure by a marker encoded digitally in bits, the encoded marker including at least one item of information, being an identifier of the camera, encoded in binary that is used to identify the camera and an item of information, being a time variable, encoded in binary that is used to identify a date on which the image was taken by the camera , the control device comprising:

an acquisition device that can acquire a secure image sent remotely by a communication device of the video system;

a securing processor;

an extraction device that is able to extract the encoded marker from the secure image, said extraction device being configured for extracting the encoded marker inserted in the image of the scene by adding, for each bit of the encoded marker, a pattern to the image in a spatial domain, wherein the pattern is characterized in that a conversion thereof into a spectral domain is a predefined sub matrix of which at least one frequency coefficient encodes the bit of the encoded marker, said extraction device being configured to send the encoded marker extracted from the secure image to said securing processor; and said securing processor is configured to cooperate with a display device of the video system, said securing processor configured to cooperate with a further securing processor in order to synchronize a time reference, said securing processor configured to verify an origin of the secure image using the identifier of the camera and a freshness of the secure image by comparison of the time variable with the time reference.

12. The control device according to claim 11, wherein said securing processor is configured to automatically send a warning signal intended to warn an operator of a failure of the video system if the freshness and/or the origin is different from a predefined security setting.

13. The control device according to claim 11, wherein said extraction device is able to extract the encoded marker from the secure image by comparing the secure image with a reference image or an unsecured image of the scene.

14. The control device according to claim 11, wherein said securing processor is configured to exchange at least one encoded message with the further securing processor via the communication device in order to synchronize the time reference.

15. A video system for flagging a failure of a video, the video system comprising:
- a camera for capturing an image of a scene;
- a remote control station;
- a communication device for sending the image to said remote control station;
- a display for displaying the image at said remote control station;
- a securing device according to claim 5; and
- a control device according to claim 11, said securing device and said control device configured to cooperate with each other to enable a securing of a transmission of the image using the video system.

\* \* \* \* \*